United States Patent
Yang

(10) Patent No.: US 9,067,326 B2
(45) Date of Patent: Jun. 30, 2015

(54) SYSTEM AND METHOD OF CONTROLLING ANKLES OF WALKING ROBOT

(71) Applicant: Hyundai Motor Company, Seoul (KR)

(72) Inventor: Woo Sung Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 267 days.

(21) Appl. No.: 13/688,107

(22) Filed: Nov. 28, 2012

(65) Prior Publication Data

US 2013/0310981 A1    Nov. 21, 2013

(30) Foreign Application Priority Data

May 15, 2012 (KR) .................. 10-2012-0051492

(51) Int. Cl.
*B25J 13/08* (2006.01)
*B25J 9/16* (2006.01)
*B62D 57/032* (2006.01)

(52) U.S. Cl.
CPC .............. *B25J 13/085* (2013.01); *Y10S 901/01* (2013.01); *B25J 9/1633* (2013.01); *B62D 57/032* (2013.01)

(58) Field of Classification Search
CPC .............................. B62D 57/032; B62D 57/02
See application file for complete search history.

(56) References Cited

U.S. PATENT DOCUMENTS

| 8,512,415 | B2 * | 8/2013 | Herr et al. ............... 623/24 |
| 2003/0125839 | A1 * | 7/2003 | Takenaka et al. ........... 700/245 |
| 2008/0300721 | A1 * | 12/2008 | Takenaka et al. ........... 700/253 |
| 2011/0178639 | A1 * | 7/2011 | Kwon et al. ............. 700/261 |
| 2012/0046789 | A1 * | 2/2012 | Kwak et al. ............. 700/258 |
| 2013/0173059 | A1 * | 7/2013 | Lee et al. .............. 700/261 |

FOREIGN PATENT DOCUMENTS

| JP | 2009-190122 A | 8/2009 |
| KR | 10-0688338 B1 | 2/2007 |
| KR | 10-2011-0084630 A | 7/2011 |
| KR | 10-2012-0016902 A | 2/2012 |

OTHER PUBLICATIONS

S.V. Sorokin and A.V. Terentiev; "On Modal Interaction, Stability and Nonlinear Dynamics of a Model Two D.O.F. Mechanical System Performing Snap-Through Motion"; Nonlinear Dynamics 16:239-257, 1998.

* cited by examiner

*Primary Examiner* — Khoi Tran
*Assistant Examiner* — Ryan Rink
(74) *Attorney, Agent, or Firm* — Mintz Levin Cohn Ferris Glovsky and Popeo, P.C.; Peter F. Corless

(57) ABSTRACT

Disclosed herein is a system and method of controlling one or more ankles of a walking robot. In the above system and method, an input torque u to be applied to an ankle of a robot is obtained by compensating a target torque $\tau_d$ with an acting torque $\tau_c$ measured using a sensor and applied by a support surface and then an actual torque $\tau$ applied by the ankle of a foot is instead fed back into the control system. Therefore, proper balance of the walking robot is ensured.

9 Claims, 1 Drawing Sheet

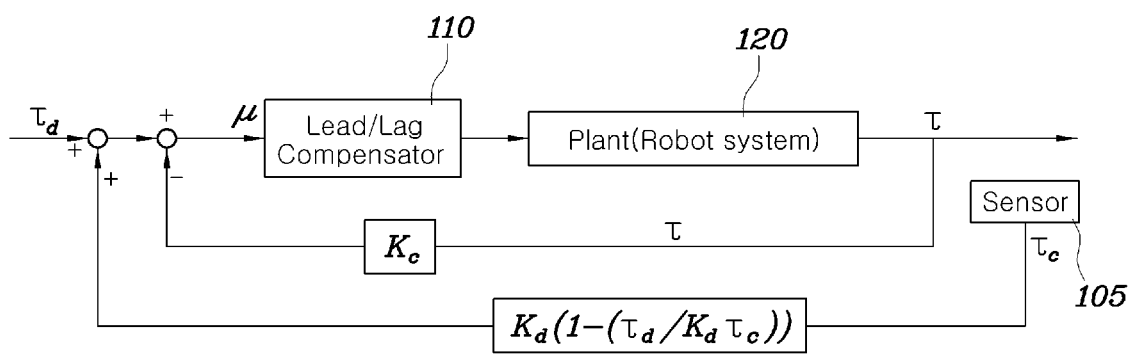

SYSTEM AND METHOD OF CONTROLLING ANKLES OF WALKING ROBOT

CROSS-REFERENCE TO RELATED APPLICATION

This application claims under 35 U.S.C. §119(a) the benefit of Korean Patent Application No. 10-2012-0051492 filed May 15, 2012, the entire contents of which are incorporated herein by reference.

BACKGROUND OF THE INVENTION

1. Field of the Invention

The present invention relates to a system and method of controlling one or more ankles of a walking robot, which autonomously achieves conformity and maintains balance within the upper body of the robot when one or more soles of the feet of the robot step on a support surface at an unknown angle.

2. Description of the Related Art

The control of balance is indispensable to biped robots due to their mechanical components and operation. In particular, the control of an actuation unit that actuates the soles of the feet of the robot that step on a support surface is important to the overall balance of the entire mechanism. That is, the soles of the feet must be supported and, at the same time, the balance of the upper body must be maintained. Conventionally, a two depth of field (D.O.F.) control algorithms related to an ankle joint controller has been suggested in a printed publication in Japan in the form of a thesis (see "On Modal Interaction, Reliability and Nonlinear Dynamics of a Model Two D.O.F. Mechanical System Performing Snap-Through Motion," Nonlinear dynamics Volume 16, Number 3, 239-257, ISSN 0924-090X). However, the control algorithm used in the above thesis does not have a desirable configuration or performance for most robotic manufactures based upon experimental results conducted by the inventors of the present application.

More specifically, the conventional technology uses a control method that calculates a target torque for an ankle of a robot, performs control using this target torque as an input torque, checks the imbalance of the robot using separate dynamics, and then performs a compensation function. However, in the conventional technology, both an error factor attributable to the difference between the sole of a foot of a robot and a support surface and an error factor attributable to the difference between control input and actual behavior are not taken into consideration. Therefore, there is a need for a control system and method which takes these factors into consideration to achieve conformity and better maintain balance within the upper body of the robot.

The description of the related art is intended merely to promote the understanding of the background of the present invention, nor is it intended to acknowledge conventional technology that is well known to those having ordinary knowledge in the technical field to which the present invention pertains.

SUMMARY OF THE INVENTION

Accordingly, the present invention has been made keeping in mind the above problems occurring in the prior art, and an object of the present invention is to provide a method of controlling one or more ankles of a walking robot, which autonomously achieves conformity and maintains the balance of the upper body of the walking robot when one or more soles of the feet of the walking robot step on a support surface at an unknown angle.

In order to accomplish the above object, the present invention provides a method of controlling ankles of a walking robot, wherein an input torque u to be applied to an ankle of a robot is obtained by compensating a target torque $\tau_d$ with an acting torque $\tau_c$ measured using a sensor and applied by a support surface and then feeding back an actual torque $\tau$ applied by the ankle of a foot to the control system, thereby ensuring the balance of walking of the robot.

The input torque u may be obtained by adding the product of the acting torque $\tau_c$ and a gain $K_d(1-(\tau_d/K_d\tau_c))$ to the target torque $\tau_d$ and then subtracting the product of the actual torque $\tau$ and a gain $K_c$ from the result of the summation (here, $K_d$ is an error compensation coefficient for a difference between an angle of a sole of a foot of the robot and an angle of the support surface, and $K_c$ is an error compensation coefficient for a difference between an intended angle and an actually attained angle of the sole of the foot).

Accordingly, the input torque u may be obtained using the equation $u=\tau_c K_d-\tau K_c$. $K_c$ may be obtained using the equation $K_c=R^{-1}B^T P$, where R is an input weight of linear quadratic regulator (LQR) control, Q is an output weight of LQR control, A, B and C are matrixes of a system, and P is a coefficient for an input x of a Hamiltonian function. $K_d$ may be obtained using the equation $K_d=R^{-1}B^T(A^T-BK_c)^{-T}C^T Q$, where R is an input weight of LQR control, Q is an output weight of LQR control, A, B and C are matrixes of a system, and P is a coefficient for an input x of a Hamiltonian function.

BRIEF DESCRIPTION OF THE DRAWINGS

The above and other objects, features and advantages of the present invention will be more clearly understood from the following detailed description taken in conjunction with the accompanying drawings, in which:

FIG. 1 is a diagram illustrating an exemplary configuration of a system and method of controlling one or more ankles of a walking robot according to an exemplary embodiment of the present invention.

DESCRIPTION OF THE PREFERRED EMBODIMENTS

Reference now should be made to the drawings, in which the same reference numerals are used throughout the different drawings to designate the same or similar components.

Although the below exemplary embodiment is described as using a plurality of units to perform the above process, it is understood that the above processes may also be performed by a single controller or unit. Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

A system and method of controlling one or more ankles of a walking robot according to a preferred embodiment of the present invention will be described below with reference to the accompanying drawings.

FIG. 1 is a diagram illustrating an exemplary configuration of a system and method of controlling one or more ankles of a walking robot according to an exemplary embodiment of the present invention. The system and method of controlling the ankles of a walking robot according to the present invention is configured to obtain an input torque u to be applied to an ankle of the robot by compensating a target torque $\tau_d$ with an acting torque $\tau_c$ measured by a sensor 105 and applied by a support surface and then feeding back the actual torque $\tau$ applied to the ankle, thereby ensuring the balance of the walking of the robot. That is, the input torque u is input to a joint of the robot, so that the angle of the actuation of the joint is controlled, thereby maintaining proper balance of the robot while walking or stopping. The actual torque $\tau$ is input into the lead/lag compensator 110 and then applied to a control portion of a robot system 120.

In order to calculate the input torque u, the target torque $\tau_d$ based on the system of the robot is calculated and then input. Since a variety of systems and methods of calculating the target torque $\tau_d$ of a robot are known, a detailed description of such a method will be omitted herein.

More specifically, the control based on the target torque $\tau_d$ of a robot is subject to two types of error factors. One type of error factor is attributable to the difference between the angle of the sole of a foot and the angle of a support surface, and the other type of error factor is attributable to the difference between the intended angle of the sole of the foot and the actually attained angle of the sole of the foot. Accordingly, it is necessary to calculate and apply an input torque u while taking into consideration the above two types of error factors.

For this purpose, the input torque u is obtained by compensating the target torque $\tau_d$ with the acting torque $\tau_c$ measured using a sensor and applied by the support surface and then feeding back the actual torque $\tau$ applied by the ankle of the foot into the control portion of the robot system 120 through the compensator 110, thereby ensuring the balance of walking of the robot.

More specifically, the input torque u is obtained by adding a value obtained by summing the product of the acting torque $\tau_c$ and a gain $K_d(1-(\tau_d/K_d\tau_c))$ to the target torque $\tau_d$ and then subtracting a product of the actual torque $\tau$ and the gain $K_c$ from the result of the addition (here, $K_d$ is an error compensation coefficient for the difference between the angle of the sole of a foot of the robot and the angle of the support surface, and $K_c$ is an error compensation coefficient for the difference between an intended angle and the actually attained angle of the sole of the foot).

Finally, the input torque u is obtained using the equation $u=\tau_c K_d-\tau K_c$. That is, the input torque u input to the robot is replaced with a value related to the acting torque $\tau_c$ applied by the support surface, and the actual torque $\tau$ applied to the ankle is fed back, thereby calculating the input torque u while taking into consideration the two types of error factors.

Meanwhile, $K_c$ may be obtained using the equation $K_c = R^{-1}B^T P$, and $K_d$ may be obtained using the equation $K_d = R^{-1}B^T (A^T-BK_c)^{-T}C^T Q$. In these equations, R is the input weight of LQR control, Q is the output weight of LQR control, A, B and C are the matrixes of the system, and P is a coefficient for the input x of a Hamiltonian function.

More specifically, a state space model for the system of the robot may be expressed by the following determinants:

$$\dot{x}=Ax+Bu$$

$$y=Cx$$

Furthermore, a performance index for LQR control is generally expressed as follows:
Performance index (Cost function)

$$J = \min_c \left[\frac{1}{2}e^T(T)Q_f e(T) + \frac{1}{2}\int_{t_0}^{T}(e^T Qe + u^T Ru)dt\right]$$

where $e=y-y_d=C(x-x_d)$, $t_0$ is the initial time, and I is the final time $$(\frac{1}{2}e^T(T)Q_f e(T))$$

is the final cost, and $$\frac{1}{2}\int_{t_0}^{T}(e^T Qe + u^T Ru)dt$$

is the running cost (integrated cost))
Furthermore, the Hamiltonian function that is used to solve the above performance index may be expressed, as follows:
Hamiltonian Function $$H=e^T Qe+u^T Ru+\lambda^T(Ax+Bu)$$

When the Hamiltonian function is solved for the maximum principle, the following can be obtained:
Use the Maximum Principle $$x = \left(\frac{\partial H}{\partial \lambda}\right)^T = Ax + Bu \quad - \text{Eq.1}$$

$$-\dot{\lambda} = \left(\frac{\partial H}{\partial x}\right)^T = C^T QC(x-x_d) + A^T\lambda \quad - \text{Eq.2}$$

If $(x, u)$ is optimal, then there exists
$\lambda(t) \in Rn$ and $v \in Rq$ $$0 = \left(\frac{\partial H}{\partial u}\right)^T = Ru + \lambda B^T \longrightarrow u = -R^{-1}B^T\lambda \quad -\text{Eq.3} \quad - \text{minimizing the cost,}$$

Furthermore, in this case, $\lambda=Px+h$. From this equation, it can be seen that a separate desired value $x_d$ is required because h is included unlike in general LQ control.

Using the above principle, the required error coefficients $K_c$ and $K_d$ can be obtained using the following process:

$$\dot{\lambda}=\dot{P}x+P\dot{x}+\dot{h}=\dot{P}x+P(Ax-BR^{-1}B^T Px-BR^{-1}B^T h)+\dot{h}$$

$$(\dot{x}=Ax+Bu=Ax+B(-R^{-1}B^T\lambda)=Ax-BR^{-1}B^T Px-BR^{-1}B^T h).$$

Using Eq 1 and Eq 3

$$\dot{P}x+P(Ax-BR^{-1}B^T Px-BR^{-1}B^T h)+\dot{h}=-C^T QC(x-x_d)-A^T\lambda=-\dot{Q}(x-x_d)-A^T(Px+h)(\dot{Q}=C^T QC).$$

Equal to Eq. 2

$$\dot{P}x+PAx-PBR^{-1}B^T Px-PBR^{-1}B^T h+\dot{h}+\dot{Q}x-\dot{Q}x_d+A^T Px+A^T h=0$$

$$-\dot{P}x=PAx-PBR^{-1}B^T Px+\dot{Q}x+A^T Px$$

$$-\dot{P}=PA+A^T P-PBR^{-1}B^T P+\dot{Q}$$

$$-\dot{h}=-PBR^{-1}B^T h-\dot{Q}x_d+A^T h$$

↓ If T goes to infinity; P and h are constant $0 = PA + A^T P - PBR^{-1}B^T P + \dot{Q}$ ←Algenraic Riccati Equation(ARE) solve for $P=P^T>0$ $0 = -PBR^{-1}B^T h - \dot{Q}x_d + A^+ h \rightarrow 0 = (A^T - PBR^{-1}B^T)h - \dot{Q}x_d \rightarrow 0 = (A - BR^{-1}B^T P)^T h - \dot{Q}x_d$ $h = (A - BR^{-1}B^T P)^{-T} \dot{Q}x_d = (A - BK_x)^{-T} C_T^T Q C x_d = (A - BK_y)^{-T} C^T Q y_d$ $\because R = R^T$ ($R$ is diagonal), $P = P^T$ (due to ARE $u = -R^{-1}B^T Px - R^{-1}B^T h = -R^{-1}B^T Px - R^{-1}B^T (A^T - BK_d)^{-T} C^T Q y_d = -K_d x - K_d Y_d$ $K_x = R^{-1}B^T P$ $K_d = R^{-1}B^T (A^T - BK_x)^{-T} C^T Q$ As can be seen from the principle, in summary, $K_c$ may be obtained using the equation $K_c = R^{-1}B^T P$, and $K_d$ may be obtained using the equation $K_d = R^{-1}B^T(A^T - BK_c)^{-T}C^T Q$. Here, A, B and C are system matrixes, and Q and R are performance indices necessary for LQR control and need to be input separately.

In general, a user may freely select values. That is, when the use places emphasis on energy efficiency, R is set to a lower value. In contrast, when the user places emphasis on the precision of final output and intensity rather than energy, Q is set to a larger value. Furthermore, when P is obtained under the condition in which x is maximal in the Hamiltonian function $H = e^T Q e + u^T R u + \lambda^T(Ax + Bu)$ and is then used, the range of control of the system is increased. According to the system and method of controlling one or more ankles of a walking robot configured as described above, the robot is enabled to autonomously and conformably step on an unknown support surface.

The angle of the actuation of the robot is controlled using a desired torque as the torque applied between the support surface and the sole of the foot, and therefore a control algorithm is configured so that a reference value is set to 0 when the acting torque $\tau_c$ should be 0 to perform balance control, with the result that a corresponding angle of the joint can be maintained and a stationary state can be achieved.

Furthermore, proportional-integral-derivative (PID) control can be easily applied because the configuration of the system is simple. Since a wearable robot operates along with a human, safety should take priority over all other things. The present invention may be applied to a safety apparatus to maintain balance and prevent rollovers in case of emergency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling one or more ankles of a walking robot, comprising:
   obtaining an input torque u to be applied to an ankle of a robot by compensating a target torque $\tau_d$ with an acting torque $\tau_c$ measured using a sensor and applied by a support surface; and
   in response to compensating the target torque with the acting torque, feeding back an actual torque $\tau$ applied by the ankle of a foot to ensure proper balance of the walking robot,
   wherein the input torque u is obtained by adding a product of the acting torque $\tau_c$ and a gain $K_d (1-(\tau_d/K_d\tau_c))$ to the target torque $\tau_d$ and then subtracting a product of the actual torque $\tau$ and a gain $K_c$ from a result of the addition wherein $K_d$ is an error compensation coefficient for a difference between an angle of a sole of the foot of the robot and an angel of the support surface, and $K_c$ is an error compensation coefficient for a difference between an intended angle and an actually attained angle of the sole of the foot.

2. The method as set forth in claim 1, wherein $K_c$ is obtained using an equation $K_c = R^{-1} B^T P$, where R is an input weight of linear quadratic regulator (LQR) control, Q is an output weight of LQR control, B is a matrix of a system, and P is a coefficient for an input x of a Hamiltonian function.

3. The method as set forth in claim 2, wherein $K_d$ is obtained using an equation $K_d = R^{-1} B^T (A^T - BK_c)^{-T} C^T Q$, where R is an input weight of LQR control, Q is an output weight of LQR control, A and C are matrices of a system, and P is a coefficient for an input x of a Hamiltonian function.

4. A non-transitory computer readable medium containing program instructions executed by a processor or controller for controlling one or more ankles of a walking robot, the non-transitory computer readable medium comprising:
   program instructions that obtain an input torque u to be applied to an ankle of a robot by compensating a target torque $\tau_d$ with an acting torque $\tau_c$ measured using a sensor and applied by a support surface; and
   program instructions that feed back an actual torque $\tau$ applied by the ankle of a foot to ensure proper balance of the walking robot in response to compensating the target torque with the acting torque,
   where the input torque u is obtained by adding a product of the acting torque $\tau_c$ and a gain $K_d (1-(\tau_d/K_d\tau_c))$ to the target torque $\tau_d$ and then subtracting a product of the actual torque $\tau$ and a gain $K_c$ from a result of the addition wherein $K_d$ is an error compensation coefficient for a difference between an angle of a sole of the foot of the robot and an angel of the support surface, and $K_c$ is an error compensation coefficient for a difference between an intended angle and an actually attained angle of the sole of the foot.

5. The non-transitory computer readable medium as set forth in claim 4, wherein $K_c$ is obtained using an equation $K_c = R^{-1} B^T P$, where R is an input weight of linear quadratic regulator (LQR) control, Q is an output weight of LQR control, B is a matrix of a system, and P is a coefficient for an input x of a Hamiltonian function.

6. The non-transitory computer readable medium as set forth in claim 5, wherein $K_d$ is obtained using an equation $K_d = R^{-1} B^T (A^T - BK_c)^{-T} C^T Q$, where R is an input weight of LQR control, Q is an output weight of LQR control, A and C are matrices of a system, and P is a coefficient for an input x of a Hamiltonian function.

7. A system for controlling one or more ankles of a walking robot, the system comprising:
   a processor configured to obtain an input torque u to be applied to an ankle of a robot by compensating a target torque $\tau_d$ with an acting torque $\tau_c$ measured using a sensor and applied by a support surface, and feed back an actual torque $\tau$ applied by the ankle of a foot to ensure proper balance of the walking robot in response to compensating the target torque with the acting torque,
   where the input torque u is obtained by adding a product of the acting torque $\tau_c$ and a gain $K_d (1-(\tau_d/K_d\tau_c))$ to the target torque $\tau_d$ and then subtracting a product of the actual torque $\tau$ and a gain $K_c$ from a result of the addition wherein $K_d$ is an error compensation coefficient for a difference between an angle of a sole of the foot of the robot and an angel of the support surface, and $K_c$ is an error compensation coefficient for a difference between an intended angle and an actually attained angle of the sole of the foot.

8. The system as set forth in claim 7, wherein $K_c$ is obtained using an equation $K_c = R^{-1} B^T P$, where R is an input weight of linear quadratic regulator (LQR) control, Q is an output weight of LQR control, B is a matrix of a system, and P is a coefficient for an input x of a Hamiltonian function.

9. The system as set forth in claim 8, wherein $K_d$ is obtained using an equation $K_d = R^{-1} B^T (A^T - BK_c)^{-T} C^T Q$, where R is an input weight of LQR control, Q is an output weight of LQR control, A and C are matrices of a system, and P is a coefficient for an input x of a Hamiltonian function.

* * * * *